May 8, 1956  L. L. GERWIG  2,744,386
DISPENSING VALVE FOR HIGH PRESSURE FLUID STORAGE FLASKS
Filed Jan. 9, 1953

INVENTOR.
Larry L. Gerwig
BY
Clinton S. Janes
ATTORNEY

WITNESS:
Arthur M. Stockton

United States Patent Office 2,744,386
Patented May 8, 1956

2,744,386

DISPENSING VALVE FOR HIGH PRESSURE FLUID STORAGE FLASKS

Larry L. Gerwig, Elmira Heights, N. Y., assignor to Bendix Aviation Corporation, a corporation of Delaware Application January 9, 1953, Serial No. 330,567

3 Claims. (Cl. 62—1)

The present invention relates to a dispensing valve for high pressure fluid storage flasks, and more particularly to a valve for controlling the release of liquefied carbon dioxide for use in a freeze tester such as shown in the application of Dickey and Hood, Serial No. 267,452, filed January 21, 1952, now Patent No. 2,651,194, granted September 8, 1953.

It is an object of the present invention to provide a novel dispensing valve which normally forms a hermetic leak-proof seal; which is easily manipulated to accurately control the escape of the fluid; and which, if damaged by careless or improper manipulation, closes automatically and cuts off the escape of the fluid.

It is another object to provide such a device which is simple and economical in construction and is adapted for extended periods of use without deterioration or significant wear.

Figure 1:
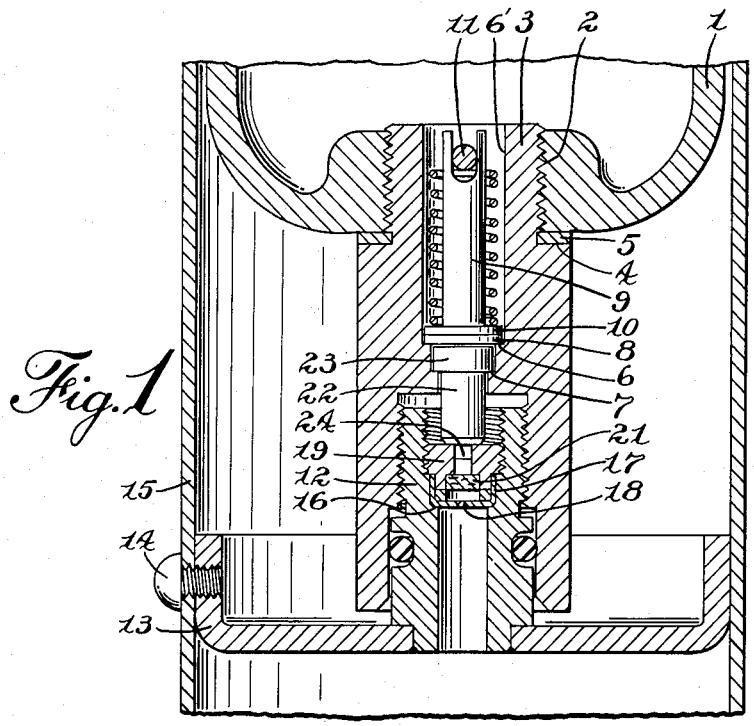
Figure 2:
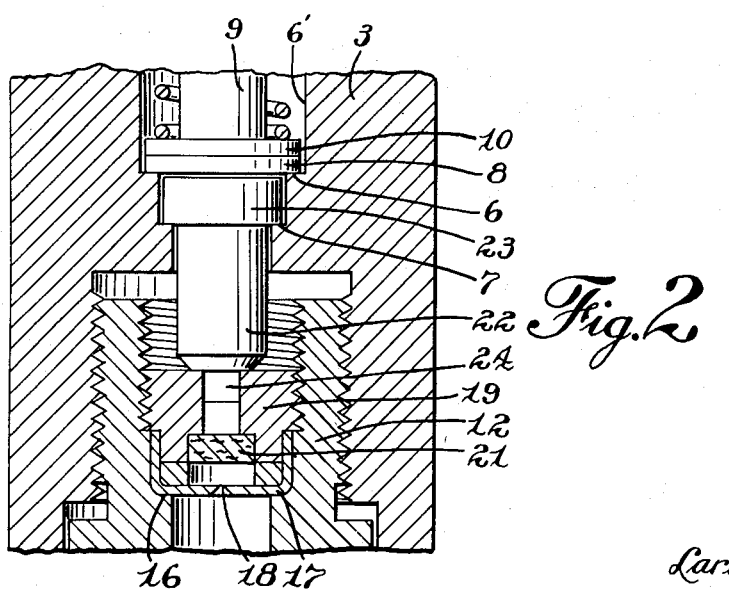

Further objects and advantages will be apparent from the following description taken in connection with the accompanying drawing in which:

Fig. 1 is a vertical substantially mid-sectional view of a portion of a compressed gas storage flask with the improved valve structure applied thereto; and Fig. 2 is an enlarged sectional detail of the valve structure.

In Fig. 1 of the drawing there is illustrated the end portion of a storage flask 1 which is tapped at 2 for the reception of a hollow threaded stem 3 having a shoulder 4 and gasket 5 forming a permanent gas-tight connection. The stem 3 is formed internally with a pair of stepped shoulders 6 and 7 having flat surfaces facing inwardly toward the flask. The larger shoulder 6 forms a valve seat, and an imperforate disc 8 of slightly elastic material such as nylon fits loosely in the enlarged bore 6' of the stem and is normally held against the valve seat by means of a spring-pressed plunger 9 having a head 10 bearing thereon. Plunger 9 is retained in the stem 3 with freedom for limited axial movement by means of a cross pin 11.

A nipple 12 is threaded in the outer end of the stem 3 and is rigidly attached in any suitable manner to a cup-shaped diaphragm 13 fixed as indicated at 14 in a stationary holder 15 for the flask 1. The nipple 12 has an internal shoulder 16 forming a seat for a cup-shaped obturator 17 having a small orifice 18 for controlling the escape of the refrigerating gas. An abutment member in the form of a hollow plug 19 is threaded in the inner end of the nipple 12 and holds the obturator 17 on its seat. Preferably a filter 21 of any suitable porous material is located in the abutment member 19 for arresting any solid particles too large to pass through the orifice 18.

A valve lifter 22 is interposed between the abutment member 19 in the nipple and the valve disc 8 for the purpose of lifting the valve off its seat 6 when the nipple 12 is threaded for a sufficient distance into the stem 3. Valve lifter 22 has a cylindrical head 23 which rests on the smaller internal shoulder 7 in the stem 3, the location of said shoulder being so spaced from the valve seat 6 that the top surface of the head 23 of the valve lifter is normally slightly below the level of the valve seat. By this arrangement, the head of the valve lifter serves to limit the outward bulging of the valve disc 8 under the pressure of the gas in the flask 1, the dimensions of the parts being so related that the valve disc will dish slightly under such pressure so as to make contact with high unit pressure upon the inner edge of the valve seat 6, but the valve disc is prevented from bulging sufficiently to warp or frill the edge of the disc which might cause leakage.

In the operation of the device in connection with a freezemeter such as disclosed in the Dickey et al. application above cited, the operator grasps the flask 1 in one hand and the holder 15 in the other and rotates the flask in the holder in a direction to screw the nipple 12 into the stem 3, thus advancing the abutment 19 and causing the lifter 22 to raise the valve disc 8 away from its seat 6. The gas in the flask is thus permitted to escape around the valve disc and the lifter which fit loosely in the stem 3, and to pass through a cross slot 24 in the top of the abutment 19, through the filter 21 and emerge through the orifice 18. The expansion of the gas as it escapes through said orifice lowers the temperature of the gas to the point where it becomes effective for its use in the freezemeter. In order to stop the flow of gas, it is merely necessary to reverse the operation, unscrewing the nipple 12 from the stem 3 whereupon the valve disc 8 is pressed against its seat initially by the spring-pressed plunger 9 and thereafter by the pressure of the gas in the flask 1.

When it becomes necessary to recharge the flask 1, it is unscrewed from the nipple 12 and screwed on the valve nipple of a storage tank. During the charging operation, the head 10 of plunger 9 forms a backing reinforcement for the valve disc 8 which prevents damage to the disc by the pressure of the incoming gas. When the flask is charged and the flow of gas from the storage tank stops, the plunger 9 returns the valve disc to its seat.

Also certain structure has been shown and described in detail, it will be understood that changes may be made in the precise form and arrangement of the parts without departing from the spirit of the invention.

I claim:

1. A dispensing valve structure for a flask containing compressed gas comprising a hollow stem rigidly attached to the flask, a pair of stepped internal annular shoulders in said stem having flat surfaces facing toward the flask, the larger shoulder constituting a valve seat, an imperforate disc of slightly elastic material normally resting on said seat and bulging outward under the pressure of the gas in the flask; a valve lifter having a flat head normally resting on the smaller shoulder in said stem, and held thereby in position to limit the outward bulging of the valve disc and thus prevent working or frilling of its rim, a nipple threaded into the outer end of said stem, and an abutment in the nipple in position to engage the valve lifter and cause it to raise the valve disc off its seat.

2. A dispensing valve as set forth in claim 1 including further an obturator in the nipple having a central orifice, said abutment having a passage leading to the orifice.

3. A dispensing valve for high-pressure fluid storage flasks and the like comprising a tubular stem rigidly connected at one end to the flask, having an internal flat annular shoulder forming a valve seat facing toward the interior of the flask, an imperforate flat valve disc fitting loosely in the stem and normally engaging said seat; a holder for the flask having a nipple threaded into the free end of the stem, a tubular abutment member in the nipple, and a solid valve lifter mounted loosely in the stem between the abutment member and the valve disc and movable by the abutment member to raise the valve disc from its seat by screwing the nipple into the stem; in which the stem is provided with a second internal shoulder of smaller diameter spaced outwardly from the first shoulder and the valve lifter is provided with a flat head fitting loosely in the bore of the stem between said shoulders, said outer shoulder serving to maintain the head in position to limit the outward flexure of the valve disc.

References Cited in the file of this patent
UNITED STATES PATENTS

| | | |
|---|---|---|
| 2,172,310 | Thomas | Sept. 5, 1939 |
| 2,354,925 | Mills | Aug. 1, 1944 |
| 2,365,423 | MacSporran | Dec. 19, 1944 |
| 2,536,428 | Dimitri | Jan. 2, 1951 |
| 2,594,539 | Brown | Apr. 29, 1952 |